US006387839B1

(12) United States Patent
Jin et al.

(10) Patent No.: US 6,387,839 B1
(45) Date of Patent: May 14, 2002

(54) COMPOUND CATALYST SYSTEM FOR SYNTHESIZING POLYETHYLENES OR COPOLYMERS OF ETHYLENE HAVING BIMODAL OR BROAD MOLECULAR WEIGHT DISTRIBUTIONS, PROCESS FOR PREPARING THE SAME AND USE OF THE SAME

(75) Inventors: Maozhu Jin; Yuexiang Liu; Renqi Peng; Huibo Shen; Meizhen Yin; Zhaowen Ma; Changbing Xie; Yijing Sun; Baolan Zhu; Baoquan Xing, all of Beijing (CN)

(73) Assignees: China Petrochemical Corporation; Beijing Research Institute of Chemical Industry Sinopec, both of Beijing (CN)

( * ) Notice: Subject to any disclaimer, the term of this patent is extended or adjusted under 35 U.S.C. 154(b) by 0 days.

(21) Appl. No.: 09/474,014

(22) Filed: Dec. 28, 1999

(30) Foreign Application Priority Data

Dec. 30, 1998 (CN) ......................................... 98126384 A

(51) Int. Cl.$^7$ ................................................ B01J 31/16
(52) U.S. Cl. ........................ 502/113; 502/152; 502/128; 502/133; 526/114; 526/160; 526/943; 526/158; 526/124.2
(58) Field of Search ................................ 502/113, 152, 502/128, 133; 526/114, 160, 943, 158, 124.2

(56) References Cited

U.S. PATENT DOCUMENTS 5,266,544 A * 11/1993 Tsutsui et al. ............... 502/113

FOREIGN PATENT DOCUMENTS

| CN | 1138598 A | 6/1995 |
| CN | 1138598 | * 12/1996 |
| EP | 0 447 070 A1 | 9/1991 |
| EP | 0 447 070 | 9/1991 |
| EP | 0 447 071 A1 | 9/1991 |

* cited by examiner

Primary Examiner—David W. Wu
Assistant Examiner—Ling-Siu Choi
(74) Attorney, Agent, or Firm—Burns, Doane, Swecker & Mathis, L.L.P.

(57) ABSTRACT

The present invention provides a compound catalyst system useful for synthesizing polyethylenes or copolymers of ethylene having bimodal or broad molecular weight distributions, prepared by incorporating an organic alcohol as an electron-donor compound and an aluminoxane compound into the prior art compound catalyst systems, thereby promoting the activities of the two active centers, which leads to not only a large improvement in the activity of the catalyst system, but also the formation of polyethylenes and copolymers of ethylene having bimodal or broad molecular weight distributions, which in turn gives polymers having excellent processability and mechanical properties. A process for preparing the solid catalyst component used in the compound catalyst system according to the present invention and use of the compound catalyst system are also disclosed.

19 Claims, 2 Drawing Sheets

US 6,387,839 B1

COMPOUND CATALYST SYSTEM FOR SYNTHESIZING POLYETHYLENES OR COPOLYMERS OF ETHYLENE HAVING BIMODAL OR BROAD MOLECULAR WEIGHT DISTRIBUTIONS, PROCESS FOR PREPARING THE SAME AND USE OF THE SAME

FIELD OF THE INVENTION

The present invention relates to a compound catalyst system useful for synthesizing polyethylenes or copolymers of ethylene having bimodal or broad molecular weight distributions, a process for preparing the catalyst component used in the compound catalyst system according to the present invention and use of the compound catalyst system according to the present invention.

BACKGROUND OF THE INVENTION

It is well known that the polymers obtained by using metallocene catalyst systems have various advantages, but their molecular weight distributions are very narrow, for example, MWD being only 2–3, and thus it is very difficult to process such polymers. Many attempts have been made with respect to the compound catalyst systems in order to improve the processability of the polymers obtained by using such catalyst systems, i.e. broaden their molecular weight distributions. By "compound catalyst system", it means that two or more different active centers are compounded together, thereby synthesizing polymers having excellent balance of processability and mechanical properties.

The types of the compound catalyst systems primarily include metallocene/metallocene compound catalyst systems and metallocene/Ziegler-Natta compound catalyst systems, with the latter being particularly preferred. By compounding a metallocene catalyst with a Ziegler-Natta catalyst, it is possible to overcome the disadvantages of the metallocene catalyst system, such as a single active center, narrow molecular weight distribution of the resulting polymers and poor processability, while maintaining its advantages, such as good stereoregularity of the resulting polymers, good copolymerizability and the like. For example, European Patent Application Publication 0 447 070 A1 discloses a solid catalyst suitable for polymerizing olefins in a heterogeneous process, comprising (1) a solid support containing from 80 to 99.5 mol % of magnesium dichloride and from 0.5 to 20 mol % of an electron-donor compound free from labile hydrogen, (2) an electron-donor compound containing labile hydrogen, (3) a zirconium metallocene, (4) at least one halide of a transition metal chosen from titanium and vanadium, and (5) an organoaluminum compound, preferably an aluminoxane compound. The catalyst disclosed therein is prepared by supporting zirconium and titanium or vanadium onto the support formed from magnesium dichloride and is suitable for the heterogeneous polymerization of olefins, and however, such a catalyst has a relatively low activity and the molecular weight distribution (Mw/Mn) of the resulting polymer is only about 4, which is still relatively narrow. European Patent Application Publication 0 447 071 A1 discloses a compound solid catalyst suitable for polymerizing olefins, comprising (1) a support containing from 90 to 99.9 mol % of magnesium dichloride and from 0.1 to 10 mol % of an electron-donor compound free from labile hydrogen, (2) a zirconium metallocene, (3) at least one halide of a transition metal chosen from titanium and vanadium, and (4) an organoaluminum compound, preferably an aluminoxane compound. The catalyst disclosed therein is prepared by supporting zirconium and titanium or vanadium onto the support formed from magnesium dichloride and is suitable for the heterogeneous polymerization of olefins, and can produce polymers having better particle morphology (Dm/Dn: 1.5; bulk density: 0.3–0.4 g/cm$^3$). Although such a catalyst has a higher ratio of Zr to Ti, for example from 2 to 20, it has a relatively low activity and the molecular weight distribution (Mw/Mn) of the resulting polymer is only about 5, which is still relatively narrow. The reason may be that part of zirconium supported is inactive for being covered, thus decreasing the activity of the whole catalyst.

Chinese Patent Application Publication CN1138589A discloses a solid compound catalyst and a catalyst system useful for polymerizing olefins. The solid compound catalyst comprises a metallocene compound, a halide of a transition metal selected from elements of Group IIIB, IVB, VB and VIB of the Periodic Table, and magnesium halide. Although the activity of the whole catalyst has been largely improved and the resulting polymer has a molecular weight distribution, Mw/Mn, of 3.5 to 9.8, no bimodal molecular weight distribution is found. It shows that the metallocene component in the catalyst fails to fully exert its activity.

An object of the present invention is to provide a compound catalyst system useful for synthesizing polyethylenes or copolymers of ethylene having bimodal or broad molecular weight distributions, which overcomes the disadvantages associated with the prior art compound catalyst systems and is prepared by incorporating an organic alcohol as an electron-donor compound and an aluminoxane compound into the prior art compound catalyst systems, thereby promoting the activities of the two active centers, which leads to not only a large improvement in the activity of the catalyst system, but also the formation of polyethylenes and copolymers of ethylene having bimodal or broad molecular weight distributions, which in turn gives polymers having excellent processability and mechanical properties.

Another object of the present invention is to provide a process for preparing the solid catalyst component used in the compound catalyst system according to the present invention.

Still another object of the present invention is to synthesize polyethylenes or copolymers of ethylene having bimodal or broad molecular weight distributions by using the compound catalyst system according to the present invention.

These and other objects, features and advantages of the present invention will be readily apparent to those skilled in the art from the following description taken in connection with the accompanying drawings.

SUMMARY OF THE INVENTION

Figure 1:
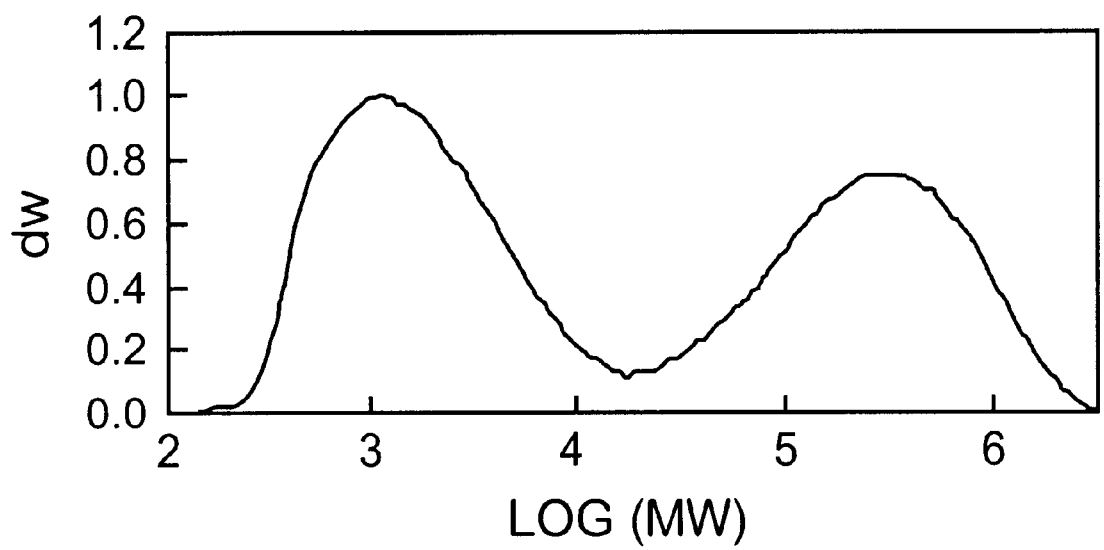
FIG. 1 is a Gel Permeation Chromatographic (GPC) spectrum of the polymer synthesized in Example 3 of the present invention.

Therefore, the present invention in its one aspect provides a compound catalyst system useful for synthesizing polyethylenes or copolymers of ethylene having bimodal or broad molecular weight distributions, comprising:

A). a solid catalyst component containing a metallocene compound and titanium or vanadium derived from a non-metallocene transition metal compound, obtained by reacting
(1) a magnesium halide solution,
(2) one or more of $C_1$–$C_{20}$ organic alcohols,
(3) a non-metallocene transition metal compound of titanium or vanadium,
(4) a metallocene compound, and
(5) an aluminoxane compound,
wherein the amounts of components (2)–(5) are respectively 0.2–95 moles, 0.2–4.0 moles, 0.05–0.6 moles and 0.15–20 moles, per mole of said magnesium halide; and B). an organoaluminum compound having the formula of $AlR_mX_{3-m}$, wherein R is hydrogen or a hydrocarbyl group having from 1 to 20 carbon atoms, X is halogen, the value of m is larger than 0 and equal to or smaller than 3, and/or the aluminoxane compound used in the solid catalyst component A), wherein the ratio of the solid catalyst component A) to the component B), in terms of the molar ratio of the total transition metals contained in the non-metallocene transition metal compound and the metallocene compound to aluminum contained in the component B), is from 0.0001:1 to 0.05:1.

The present invention in its second aspect provides a process for the preparation of the solid catalyst component A) used in the compound catalyst system according to claim 1, comprising the steps of:

(1) preparing a solution of magnesium halide by dissolving the magnesium halide in a solvent system essentially consisting of an organic epoxy compound and an organophosphorus compound, at a temperature of 0° C. to 150° C.;

(2) reacting the resultant magnesium halide solution from step (1) with a non-metallocene transition metal compound of titanium or vanadium, a metallocene compound and an aluminoxane compound at a temperature of −30° C. to 100° C.; and (3) washing the product from step (2) with an inert solvent to remove the metallocene compound and the aluminoxane compound which are not supported, followed by drying to obtain the solid catalyst component A); wherein one or more of $C_1$–$C_{20}$ organic alcohols are added in step (1) or step (2).

The present invention in its third aspect provides use of the compound catalyst system according to the present invention for synthesizing polyethylenes or copolymers of ethylene having bimodal or broad molecular weight distributions.

DETAILED DESCRIPTION OF THE INVENTION

The Compound Catalyst System of the Invention

The magnesium halide solution used in the solid catalyst component A) of the compound catalyst system according to the present invention is a homogeneous solution obtained by dissolving the magnesium halide in a solvent system essentially consisting of an organic epoxy compound and an organophosphorus compound, with the amounts of said epoxy compound and said organophosphorus compound being respectively 0.2–10 moles, preferably 0.5–4 moles, and 0.1–3 moles, preferably 0.3–1.0 moles, per mole of magnesium halide. If desired, an inert diluent described below can be added to the above solvent system.

The magnesium halide which can be used in the present invention is one or more of magnesium dihalide, its complexes with water or an alcohol and the like, and the derivatives thereof by replacing one halogen atom with a hydrocarbyl group or a hydrocarboxyl group, with magnesium dichloride, magnesium dibromide or magnesium diiodide being preferred.

The organic epoxy compounds which can be used in the present invention include oxides of aliphatic olefins and diolefins, the halogenated derivatives thereof, glycidyl ethers, inner ethers, all having from 2 to 8 carbon atoms, and the mixtures of them. Preferred are ethylene oxide, propylene oxide, butylene oxide, butadiene oxide, butadiene dioxide, epichlorohydrin, methyl glycidyl ether, diglycidyl ether, tetrahydrofuran and the like.

The organophosphorus compounds which can be used in the present invention include hydrocarbyl or halohydrocarbyl esters of phosphoric acid or phosphorous acid. Preferred are trimethyl phosphate, triethyl phosphate, tributyl phosphate, triphenyl phosphate, trimethyl phosphite, triethyl phosphite, tributyl phosphite, phenyl methyl phosphite and the like.

The $C_1$–$C_{20}$ organic alcohol used in the present invention is used as an electron-donor activator and can be branched or linear. Suitable examples of such an alcohol is one or more of methanol, ethanol, isopropanol, propanol, butanol, hexanol, octanol and the like, with ethanol, propanol or butanol being preferred.

The non-metallocene transition metal compounds which can be used in the compound catalyst system according to the present invention include titanium compounds having the formula $Ti(OR')_{4-n}X_n$, or vanadium compounds having the formula $V(OR')_x(O)_yX_z$, wherein R' is a linear or branched alkyl having from 1 to 12 carbon atoms, X is halogen, n is 0 or an integer of 1 to 4, x is 0 or an integer of 1 to 5, y is 0 or 1, z=(2−x−2y) or 3, 4 or 5 when x and y are both 0. Specifically, the non-metallocene transition metal compounds can be selected from the group consisting of titanium tetrachloride, titanium tetrabromide, titanium tetraiodide, titanium tetrabutoxide, titanium tetraethoxide, triethoxytitanium chloride, diethoxytitanium dichloride, ethoxytitanium trichloride, vanadium trichloride, vanadium tetrachloride, vanadium pentachloride, vanadium pentabromide, vanadylic chloride, and the mixtures thereof, with titanium tetrachloride or titanium tetrabromide being preferred.

The metallocene compounds which can be used in the compound catalyst system according to the present invention can be represented by the formula $(Cp)(Cp')MeR^1R^2$, wherein Cp and Cp' are the same or different and are independently unsubstituted or substituted cyclopentadienyl, fluorenyl, indenyl or tetrahydroindenyl, and Cp and Cp' can also be bridged by a group containing carbon atoms or other atoms, Me is a transition metal selected from titanium, hafnium and zirconium, $R^1$ and $R^2$ are the same or different and are independently halogens or alkoxy groups. Specifically, the metallocene compounds can be selected from bis(cyclopentadienyl)dichlorozirconium, bis(cyclopentadienyl)dichlorotitanium, bis(cyclopentadienyl)dichlorohafnium, bis(cyclopentadienyl)methylchlorotitanium, bis(cyclopentadienyl)dimethyzirconium, bis(cyclopentadienyl)dimethyltitanium, ethylenebis(indenyl)dichlorozirconium, ethylenebis(indenyl)dichlorohafnium, ethylenebis(2,4,7-trimethylindenyl)dichlorozirconium, ethylenebis(tetrahydroindenyl)dichlorozirconium, diphenylmethylene(indenyl)(cyclopentadienyl)dichlorozirconium, dimethylmethylene (indenyl)(cyclopentadienyl)dichlorozirconium, dimethylmethylene(indenyl)(3-methylcyclopentadienyl)dichlorozirconium, diphenylmethylene(fluorenyl)(cyclopentadienyl)dichlorozirconium, dimethylmethylene(fluorenyl)(cyclopentadienyl)dichlorozirconium, dimethylmethylene(fluorenyl)(cyclopentadienyl)dichlorohafnium, and dimethylgermylenebis(2-methyl-4-phenylindenyl)dichlorozirconium, with bis(cyclopentadienyl)dichlorozirconium or ethylenebis(indenyl)dichlorozirconium being preferred.

The aluminoxane compounds which can be used in the compound catalyst system according to the present invention can be represented by the formula

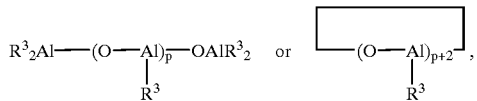

wherein $R^3$ is an alkyl group having from 1 to 12 carbon atoms, preferably methyl, ethyl, propyl, butyl, pentyl, hexyl, octyl, with methyl being the most preferred; p is from 1 to 25, preferably from 1 to 20.

The organoaluminum compounds which can be used in the compound catalyst system according to the present invention can be represented by the formula $AlR_mX_{3-m}$, wherein R is hydrogen or a hydrocarbyl group having from 1 to 20 carbon atoms, preferably alkyl, aralkyl and aryl, X is halogen, preferably chlorine and bromide, the value of m is larger than 0 and equal to or smaller than 3. Specific examples of suitable organoaluminum compound include trimethyl aluminum, triethyl aluminum, triisobutyl aluminum, trioctyl aluminum, diethyl aluminum hydride, diisobutyl aluminum hydride, diethyl aluminum chloride, diisobutyl aluminum chloride, ethyl aluminum sesquichloride, ethyl aluminum dichloride, and the like, with triethyl aluminum and triisobutyl aluminum being preferred.

In the solid catalyst component A) of the compound catalyst system according to the present invention, the amounts of components (2)–(5) are respectively 0.2–95 moles, 0.2–4.0 moles, 0.05–0.6 moles and 0.15–20 moles, per mole of said magnesium halide, preferably 0.5–50 moles, 0.3–3.0 moles, 0.1–0.5 moles and 0.3–15 moles, per mole of said magnesium halide.

Preparation of the Solid Catalyst Component A)

In the preparation of the solid catalyst component A) of the compound catalyst system according to the present invention, the first step is to prepare a magnesium halide solution. To prepare such a solution, magnesium halide is dissolved in a solvent system essentially consisting of an organic epoxy compound and an organophosphorus compound, at a temperature ranging from 0° C. to 150° C., preferably from 20° C. to 80° C. During the dissolution, an inert diluent which will facilitate the dissolution of magnesium halide, such as hexane, heptane, octane, benzene, toluene, xylenes, 1,2-dichloroethane, chlorobenzenes, other hydrocarbons or halogenated hydrocarbons, can be added to the above solvent system. The above inert diluents can be used alone or in combination.

In the preparation of the solid catalyst component A) of the compound catalyst system according to the present invention, the second step is to react the magnesium halide solution from the first step with a non-metallocene transition metal compound of titanium or vanadium, a metallocene compound and an aluminoxane compound at a temperature of −30° C. to 100° C. In such a reaction, the sequence for adding the non-metallocene transition metal compound of titanium or vanadium, the metallocene compound and the aluminoxane compound is not critical. For example, the magnesium halide solution can be reacted first with the non-metallocene transition metal compound to form a precipitate, which is reacted with the aluminoxane compound after being washed, then with the metallocene compound; or the precipitate can be directly reacted with the aluminoxane compound/the metallocene compound mixture, without washing. Alternatively, the magnesium halide solution can be reacted first with the aluminoxane compound/the metallocene compound mixture and then with the non-metallocene transition metal compound.

In the preparation of the solid catalyst component A) of the compound catalyst system according to the present invention, the third step is to wash the product from the second step with an inert solvent to remove the metallocene compound and the aluminoxane compound which are not supported, followed by drying to obtain the solid catalyst component A). Suitable inert solvents include hexane, heptane, octane, isopentane, toluene, xylenes and the like.

(Co)polymerization of Ethylene

The compound catalyst system according to the present invention can be used in the homopolymerization of ethylene and also in the copolymerization of ethylene with other alpha-olefins. Suitable examples of the other alpha-olefins include propylene, butene-1, 4-methyl-pentene-1, hexene-1, octene-1, styrene, methylstyrenes and the like. The polymerization process can be carried out in liquid phase or gas phase, either by a batched mode, a semicontinuous mode or a continuous mode. When employing liquid phase polymerization, it can be carried out in the presence of an inert solvent as polymerization medium. Suitable examples of the inert solvent include saturated aliphatic or aromatic hydrocarbons such as hexane, heptane, cyclohexane, naphtha, raffinate oil, hydrogenated gasoline, kerosene, benzene, toluene, xylene and the like. The olefins to be polymerized can also be used as polymerization medium.

The compound catalyst system according to the present invention may be employed as such in polymerization, or in the form of an olefin prepolymer.

The polymerization process is carried out at a temperature ranging from 0° C. to 150° C., preferably from 40° C. to 100° C. Hydrogen can be used as a molecular weight modifier to regulate the molecular weight of the polymer. In addition to the alkyl aluminum as cocatalyst, addition of an aluminoxane compound can further enhance the activity of the compound catalyst system according to the present invention and broaden the molecular weight distribution of the polymer.

EXAMPLES

The following examples illustrate the present invention but are not limitative.

In the examples, the molecular weight (Mw and Mn) and the molecular weight distribution (Mw/Mn) of the polymer are measured by Gel Permeation Chromatographic (GPC) method (ortho-dichlorobenzene as solvent, 135° C.); the tensile strength is measured according to ASTM D 638; the elongation at break and the Izod impact strength (notched) are measured according to ASTM D 256 and the melt index (MI) is measured according to ASTM D 1238.

Example 1

Preparation of the Catalyst Component

Into a 500-ml glass reactor which has been thoroughly purged with nitrogen, 8.0 g $MgCl_2$, 100 ml toluene, 12 ml ethanol, 5.6 ml tributyl phosphate and 5.0 ml epichlorohydrin are fed at 50° C. The resulting mixture is stirred at that temperature until $MgCl_2$ is completely dissolved. The resulting solution is then allowed to cool to −11° C., to which is added 40 ml $TiCl_4$, and then the resulting mixture is raised to a temperature of 90° C. under stirring and maintained at that temperature for 0.5 hour. After subjected to suction, the resulting solid is washed with toluene (2×100 ml) and then with hexane (2×100 ml). To the washed solid are added 10 ml methyl aluminoxane (MAO) (10 wt % dissolved in toluene, available from Ethyl Company, USA) and 40 ml toluene, followed by 1.0 g bis(cyclopentadienyl)dichlorozirconium. The resulting mixture is heated to a temperature of 50° C. and maintained at that temperature for 0.5 hour, and then subjected to suction, followed by washing with toluene (2×50 ml) and then with hexane (2×50 ml). The washed solid is then dried under vacuum to give 18.0 g the solid catalyst component as powder.

The solid catalyst component thus-obtained is subjected to analysis and is found that the composition is as follows: Mg 10.2 wt %, Al 12.23 wt %, Zr 2.91 wt %, Cl 67.66 wt %, Ti 6.99 wt %.

Polymerization

Into a 2-liter autoclave which has been thoroughly purged with nitrogen, 1000 ml hexane, 3.0 ml triethyl aluminum (1.0M hexane solution), 10 ml MAO (10% toluene solution) and 2.5 mg the solid catalyst component as prepared above are fed. Ethylene is fed until a pressure of 0.8 MPa is reached and the polymerization is then carried out at that pressure and a temperature of 70° C. for 2 hours. After drying, 290 g polyethylene powders are obtained. The polymerization activity is measured to be $6.5\times10^7$ gPE per mole of total transition metals.

Example 2

Preparation of the Catalyst Component

The same procedure as described in Example 1 is used.

Polymerization

The same procedure as described in Example 1 is used, except that the amount of the solid catalyst component is changed to 5.2 mg and prior to feeding ethylene, hydrogen is fed until a pressure of 0.2 MPa is reached. 110 g polyethylene powders are obtained and the polymerization activity is $1.2\times10^7$ gPE per mole of total transition metals. The resultant polyethylene is subjected to analysis and is found to have the following properties: $MI_{2.16}$, 0.021, $MI_{21.6}/MI_{2.16}$, 173(Melt Index (MI) is measured at a temperature of 190° C. and a load of 2.16 kg ($MI_{2.16}$) or 21.6 kg ($MI_{21.6}$)).

Example 3

Preparation of the Catalyst Component

A. Into a 500-ml glass reactor which has been thoroughly purged with nitrogen, 15 g $MgCl_2$, 120 ml toluene, 23 ml ethanol, 8.4 ml tributyl phosphate and 6 ml epichlorohydrin are fed at 50° C. The resulting mixture is stirred at that temperature until $MgCl_2$ is completely dissolved. The resulting solution is then allowed to cool to −6° C., to which is added 40 ml $TiCl_4$, and then the resulting mixture is raised to a temperature of 50° C. under stirring and maintained at that temperature for 0.5 hour. After subjected to suction, the resulting solid is washed with toluene (2×50 ml) and then with hexane (2×50 ml) and then stored for further use.

B. Into a 500-ml glass reactor which has been thoroughly purged with nitrogen, are added 2.9 g bis(cyclopentadienyl)dichlorozirconium, 10 ml MAO (10 wt % toluene solution) and 70 ml toluene, the resulting mixture is then stirred so as to dissolve bis(cyclopentadienyl)dichlorozirconium. After bis(cyclopentadienyl)dichlorozirconium is completely dissolved, to the resulting solution is added 6.5 g the product from step A. The resulting mixture is heated to a temperature of 60° C. under stirring and maintained at that temperature for 1 hour. After cooling to room temperature, the reaction mixture is subjected to suction, followed by washing with toluene (2×50 ml) and then with hexane (2×50 ml). The washed solid is then dried under vacuum to give the solid catalyst component.

The solid catalyst component thus-obtained is subjected to analysis and is found that the composition is as follows: Mg 7.43 wt %, Al 23.3 wt %, Zr 4.82 wt %, Cl 53.45 wt %, Ti 10.96 wt %.

Polymerization

Into a 2-liter autoclave which has been thoroughly purged with nitrogen, 1000 ml hexane, 30 ml hexene, 3.0 ml triethyl aluminum (1.0M hexane solution), 30 ml MAO (10% toluene solution) and 17.1 mg the solid catalyst component as prepared above are fed. To the autoclave is fed hydrogen until a pressure of 0.5 MPa is reached, and then ethylene is fed until a total pressure of 1.0 MPa is reached and the polymerization is carried out at that pressure and a temperature of 70° C. for 2 hours. After drying, 125 g polyethylene powders are obtained.

The resultant polymer is subjected to analysis and is found to have the following properties: $MI_{2.16}$, 0.094, $MI_{21.6}/MI_{2.16}$, 67, Bulk Density, 0.30 g/cm$^3$, Mw, 237204, Mw/Mn, 60, Short Chain Branches, 6.8CH$_3$/1000 C. (calculated from IR spectrum).

The resultant polymer has a molecular weight distribution curve as shown in FIG. 1.

Comparative Example

Comparison of the Short Chain Branches and the Molecular Weight Distribution Mw/Mn Polymerization Into a 2-liter autoclave which has been thoroughly purged with nitrogen, 1000 ml hexane, 30 ml hexene, 3.0 ml triethyl aluminum (1.0M hexane solution) and 12.2 mg the product from Example 3, A. (i.e. Ziegler-Natta catalyst having single active center) are fed. To the autoclave is fed hydrogen until a pressure of 0.25 MPa is reached, and then ethylene is fed until a total pressure of 1.0 MPa is reached and the polymerization is carried out at that pressure and a temperature of 70° C. for 2 hours. After drying, 156 g polyethylene powders are obtained.

The resultant polymer is subjected to analysis and is found to have the following properties: $MI_{2.16}$, 0.11, $MI_{21.6}$, 4.04, $MI_{21.6}/MI_{2.16}$, 36.7, Mw, 228215, Mn, 57804, Mw/Mn, 3.95, Short Chain Branches, 2.7CH$_3$/1000 C. (calculated from IR spectrum).

Example 4

Preparation of the Catalyst Component

The same procedure as described in Example 3 is used.

Polymerization

The same procedure as described in Example 3 is used, except that the amount of the solid catalyst component is changed to 16.3 mg, the partial pressure of hydrogen is changed to 0.3 MPa and the polymerization temperature is changed to 50° C. The resultant polymer is subjected to analysis and is found to have the following properties: Mw, 209798, Mw/Mn, 76.

Figure 2:
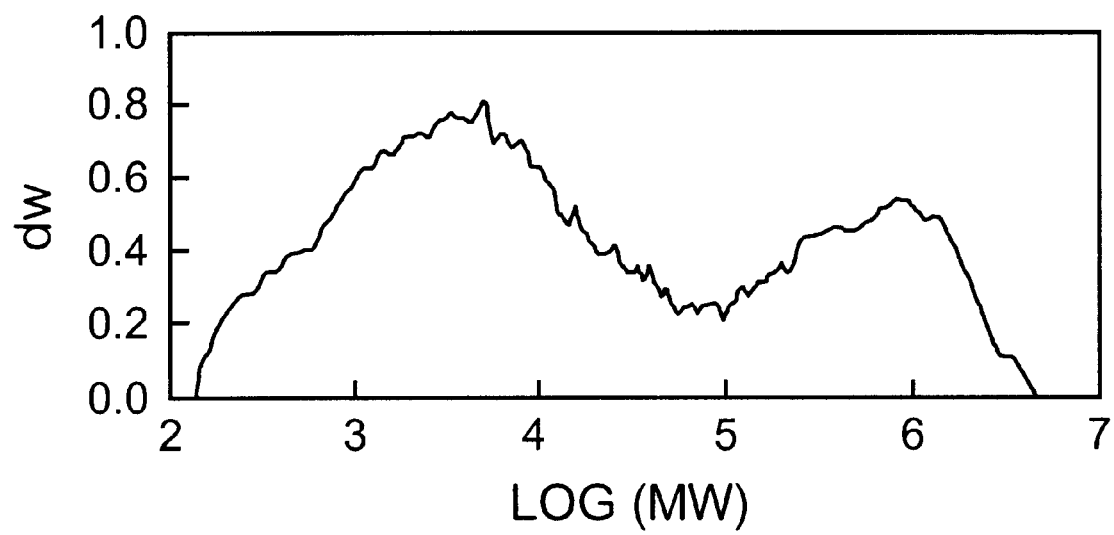
FIG. 2 is a GPC spectrum of the polymer synthesized in Example 4 of the present invention.

The resultant polymer has a molecular weight distribution curve as shown in FIG. 2.

Example 5

Preparation of the Catalyst Component

The same procedure as described in Example 3 is used.

Polymerization

The same procedure as described in Example 3 is used, except that the amount of the solid catalyst component is changed to 12.4 mg, the partial pressure of hydrogen is changed to 0.3 MPa and the polymerization temperature is changed to 90° C. The resultant polymer is subjected to analysis and is found to have the following properties: Mw, 284011, Mw/Mn, 54.5.

Figure 3:
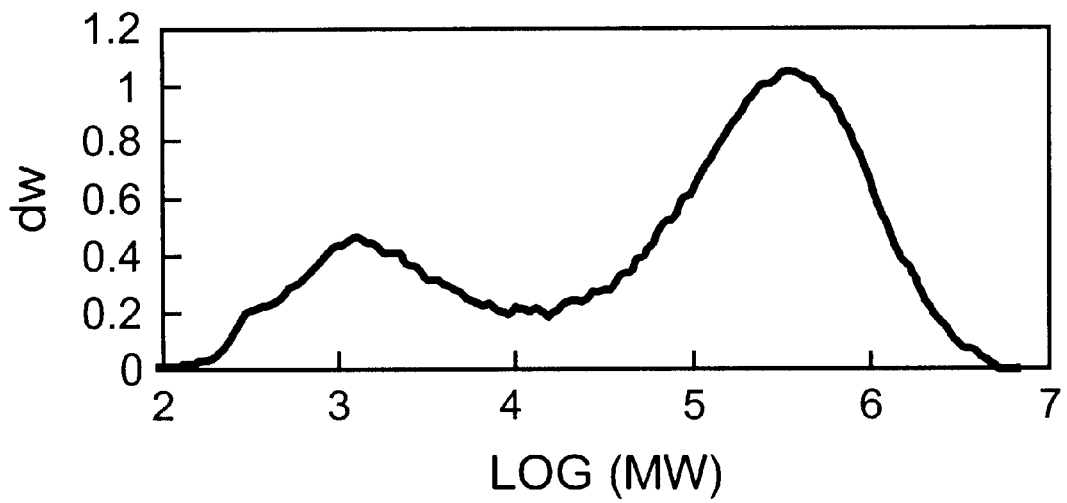
FIG. 3 is a GPC spectrum of the polymer synthesized in Example 5 of the present invention.

The resultant polymer has a molecular weight distribution curve as shown in FIG. 3.

Example 6
Preparation of the Catalyst Component

The same procedure as described in Example 3 is used.
Polymerization

Into a 5-liter autoclave which has been thoroughly purged with nitrogen, 2500 ml hexane, 5 ml triethyl aluminum, 20 ml MAO and 17.9 mg the solid catalyst component as prepared above are fed. To the autoclave is fed hydrogen until a pressure of 0.1 MPa is reached, and then ethylene is fed until a total pressure of 1.0 MPa is reached and the polymerization is carried out at that pressure and a temperature of 70° C. for 2 hours.

The resultant polymer is subjected to analysis and is found to have the following properties: tensile strength, 32.0 MPa, elongation at break, 545%, Izod impact strength (notched), 1001 J/m.

Example 7
Preparation of the Catalyst Component

Into a 500-ml glass reactor which has been thoroughly purged with nitrogen, 1.22 g ethylenebis(indenyl) dichlorozirconium and 10 ml MAO (10% toluene solution) are fed. The resulting mixture is stirred until ethylenebis(indenyl)dichlorozirconium is completely dissolved. To the resulting solution is added 6.2 g the product from Example 3, A., and then the resulting mixture is reacted at a temperature of 50° C. under stirring for 1 hour. After cooling to room temperature and subjecting to suction, the resulting solid is washed with toluene (2×50 ml) and then with hexane (2×50 ml). The washed solid is then dried under vacuum to give 10.9 g the solid catalyst component as powder.

The solid catalyst component thus-obtained is subjected to analysis and is found that the composition is as follows: Mg 5.93 wt %, Al 37.20 wt %, Zr 5.23 wt %, Cl 43.88 wt %, Ti 7.76 wt %.
Polymerization Into a 2-liter autoclave which has been thoroughly purged with nitrogen, 1000 ml hexane, 5 ml triethyl aluminum, 20 ml MAO and 18.2 mg the solid catalyst component as prepared above are fed. To the autoclave is fed hydrogen until a pressure of 0.4 MPa is reached. Ethylene is then fed until a total pressure of 1.0 MPa is reached and the polymerization is carried out at that pressure and a temperature of 70° C. for 2 hours.

The resultant polymer is measured to have Mw of 53038 and Mw/Mn of 8.1.

Example 8
Preparation of the Catalyst Component

Into a 500-ml glass reactor which has been thoroughly purged with nitrogen, 5.0 g $MgCl_2$, 50 ml toluene, 6 ml isopropanol, 5 ml tributyl phosphate and 5.0 ml epichlorohydrin are fed at 50° C. The resulting mixture is stirred at that temperature until $MgCl_2$ is completely dissolved. The resulting solution is then allowed to cool to 0° C., to which is added 20 ml $TiCl_4$, and then the resulting mixture is raised to a temperature of 50° C. under stirring and maintained at that temperature for 0.5 hour. After subjected to suction, the resulting solid is washed with toluene (2×70 ml) and then with hexane (2×70 ml). To the washed solid are added 2.0 g bis(cyclopentadienyl)dichlorozirconium and 50 ml MAO. The resulting mixture is heated to a temperature of 50° C. and maintained at that temperature for 0.5 hour, and then subjected to suction, followed by washing with toluene (2×70 ml) and then with hexane (2×70 ml). The washed solid is then dried under vacuum to give 15.7 g the solid catalyst component as powder. The solid catalyst component thus-obtained is subjected to analysis and is found that the composition is as follows: Mg 12.59 wt %, Al 15.57 wt %, Zr 6.55 wt %, Cl 55.83 wt %, Ti 7.06 wt %.
Polymerization The same procedure as described in Example 7 is used, except that the amount of the solid catalyst component is changed to 12.5 mg and the partial pressure of hydrogen is changed to 0.3 MPa.

The resultant polymer is subjected to analysis and is found to have the following properties: Bulk Density, 0.365 $g/cm^3$; $MI_{2.16}$, 0.31; $MI_{21.6}/MI_{2.16}$, 52; Mw, 236243; Mw/Mn, 15.8.

Example 9
Polymerization

Into a 2-liter autoclave which has been thoroughly purged with nitrogen, 1000 ml hexane, 60 ml hexene, 3 ml triethyl aluminum (1M hexane solution), 22.5 mg the solid catalyst component as prepared in Example 8 are fed. To the autoclave is fed hydrogen until a pressure of 0.3 MPa is reached. Ethylene is then fed until a total pressure of 1.0 MPa is reached and the polymerization is carried out at that pressure and a temperature of 70° C. for 2 hours. 501 g polyethylene powders are obtained.

The resultant polymer is subjected to analysis and is found to have the following properties: tensile strength, 33.1 MPa; elongation at break, 444%; Izod impact strength (notched), 842 J/m.

Example 10
Preparation of the Catalyst Component

The same procedure as described in Example 3 is used.
Polymerization

The same procedure as described in Example 3 is used, except that the amount of the solid catalyst component is changed to 11.5 mg and the amount of hexene is changed to 100 ml.

The resultant polymer is subjected to analysis and is found to have Mw of 172061 and Mw/Mn of 31.03.

Figure 4:
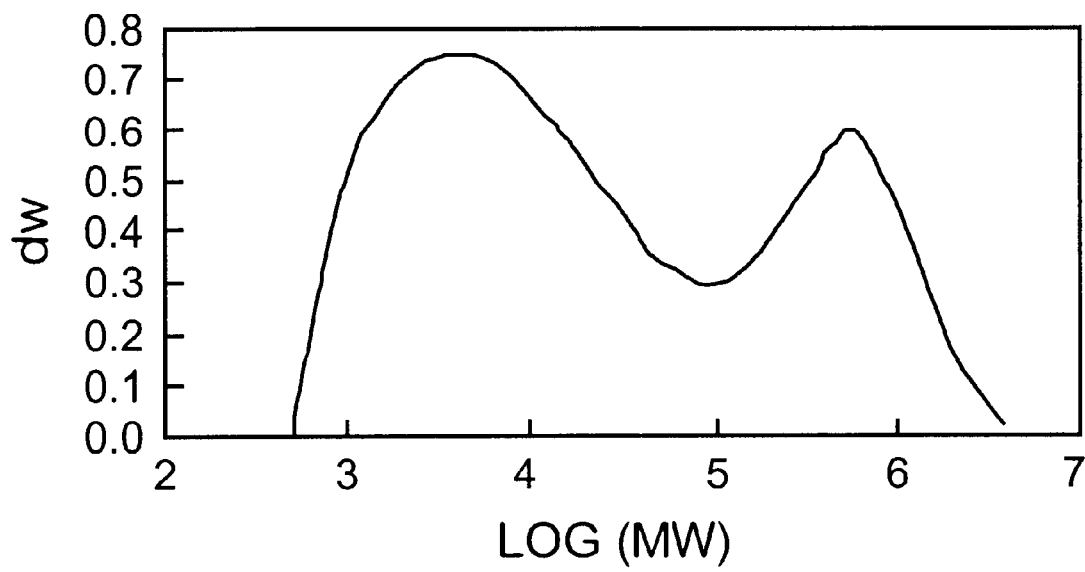
FIG. 4 is a GPC spectrum of the polymer synthesized in Example 10 of the present invention.

The resulting polymer has a molecular weight distribution curve as shown in FIG. 4.

Example 11
Preparation of the Catalyst Component

Into a 500-ml glass reactor which has been thoroughly purged with nitrogen, 6.0 g $MgCl_2$, 90 ml toluene, 1 ml ethanol, 7.5 ml tributyl phosphate and 7.5 ml epichlorohydrin are fed at 50° C. The resulting mixture is stirred at that temperature until $MgCl_2$ is completely dissolved. The resulting solution is then allowed to cool to 0° C., to which is added 20 ml $TiCl_4$, and then the resulting mixture is raised to a temperature of 90° C. under stirring and maintained at that temperature for 1 hour. After subjected to suction, the resulting solid is washed with toluene (2×70 ml) and then with hexane (2×70 ml). To the washed solid are added 2.0 g bis(cyclopentadienyl)dichlorozirconium and 25 ml MAO. The resulting mixture is heated to a temperature of 50° C. and maintained at that temperature for 0.5 hour, and then cooled to room temperature, subjected to suction, followed by washing with toluene (2×70 ml) and then with hexane (2×70 ml). The washed solid is then dried under vacuum to give 10 g the solid catalyst component as powder.

Polymerization

Into a 2-liter autoclave which has been thoroughly purged with nitrogen, 1000 ml hexane, 5 ml triethyl aluminum (1M hexane solution), 10 ml MAO and 12 mg the solid catalyst component as prepared above are fed. To the autoclave is fed hydrogen until a pressure of 0.2 MPa is reached. Ethylene is then fed until a total pressure of 1.0 MPa is reached and the polymerization is carried out at that pressure and a temperature of 80° C. for 2 hours. After drying, 402 g polyethylene powders are obtained.

The resultant polymer is subjected to analysis and is found to have the following properties: tensile strength, 34 MPa; elongation at break, 766%; Izod impact strength (notched), 1053 J/m.

In comparison with the prior art compound catalyst systems, the compound catalyst system according to the present invention, when used for (co)polymerizing ethylene, have significant advantages as follows:

1. The compound catalyst system according to the present invention exhibits higher polymerization activity when used for polymerizing ethylene, for example, in the absence of hydrogen, it is $6.5 \times 10^7$ gPE per mole of total transition metals (polymerization time: 2 hours; 70° C.; 0.8 MPa) and in the presence of hydrogen, it is $1.2 \times 10^7$ gPE per mole of total transition metals (polymerization time: 2 hours; 70° C.; 0.2 MPa $H_2$), and however, the polymerization activity of the catalyst system disclosed in EP 0447071A1 is $1.4 \times 10^6$ gPE per mole of total transition metals (polymerization time: 2 hours; 70° C.; 0.2 MPa $H_2$);

2. The ethylene (co)polymers obtained by using the compound catalyst system according to the present invention have broad molecular weight distributions, Mw/Mn ranging from 3 to 76, and the molecular weight distribution curves are typically bimodal or in very broad unimodal type, and however, the polymers disclosed in Chinese Patent Application Publication CN 1138589A have molecular weight distributions, Mw/Mn, ranging from 3.5 to 9.8, and no bimodal molecular weight distributions are reported therein;

3. The breadth and shape of the molecular weight distribution curve can be regulated by altering the polymerization conditions, for example, by using a same compound catalyst system, polymers having different molecular weight distributions can be obtained by altering the polymerization conditions (such as polymerization temperatures), and thus it is convenient to produce polymers having molecular weight distributions for meeting special requirements;

4. The compound catalyst system according to the present invention exhibits good copolymerizability when used for copolymerizing ethylene with other alpha-olefins;

5. By using the compound catalyst system according to the present invention for ethylene polymerization, the resulting polymer has a melt flow ratio ($MI_{21.6}/MI_{2.16}$) ranging from 40 to 180 ($MI_{2.16}$=0.01–2), and the processability of the polymer are largely improved due to the larger melt flow ratio;

6. The polymer obtained by using the compound catalyst system according to the present invention has a tensile strength of above 32.0 MPa, an elongation at break of above 500% and an Izod impact strength (notched) of above 1000 J/m.

What is claimed is:

1. A compound catalyst system used for synthesizing polyethylenes or copolymers of ethylene having bimodal or broad molecular weight distributions, comprising:

A) a solid catalyst component containing a metallocene compound and titanium or vanadium derived from a non-metallocene transition metal compound, obtained by reacting
   (1) a magnesium halide solution, wherein said magnesium halide solution is a homogeneous solution formed by dissolving magnesium halide in a solvent system consisting essentially of an organic epoxy compound and an organophosphorus compound, with the amounts of said epoxy compound and said organophosphorus compound being respectively 0.2–10 moles and 0.1–3 moles, per mole of magnesium halide,
   (2) one or more of $C_1$–$C_{20}$ organic alcohols,
   (3) a non-metallocene transition metal compound of titanium or vanadium;
   (4) a metallocene compound, and
   (5) an aluminoxane compound,
wherein the amounts of components (2)–(5) are respectively 0.2–95 moles, 0.2–4.0 moles, 0.05–0.6 mole and 0.15–20 moles per mole of said magnesium halide; and B) an organoaluminum compound having the formula of $AlR_mX_{3-m}$ wherein R is hydrogen or a hydrocarbyl group having from 1 to 20 carbon atoms, X is halogen, the value of m is larger than 0 and equal to or smaller than 3, and/or the aluminoxane compound used in the solid catalyst component A) wherein the ratio of the solid catalyst component A) to the component B), in terms of the molar ratio of the total transition metals contained in the non-metallocene transition metal compound and the metallocene compound to aluminum contained in the component B), is from 0.0001:1 to 0.05:1.

2. The compound catalyst system according to claim 1, wherein said non-metallocene transition metal compound is a titanium compound having the formula $Ti(OR')_{4-n}X_n$, or a vanadium compound having the formula $V(OR')_x(O)_yX_z$, wherein R' is a linear or branched alkyl having from 1 to 12 carbon atoms, X is halogen, n is 0 or an integer of 1 to 4, x is 0 or an integer of 1 to 5, y is 0 or 1, z=(2−x−2y) or 3,4 or 5 when x and y are both 0.

3. The compound catalyst system according to claim 1, wherein said non-metallocene transition metal compound is selected from the group consisting of titanium tetrachloride, titanium tetrabromide, titanium tetraiodide, titanium tetrabutoxide, titanium tetraethoxide, triethoxytitanium chloride, diethoxytitanium dichloride, ethoxytitanium trichloride, vanadium trichloride, vanadium tetrachloride, vanadium pentachloride, vanadium pentabromide, vanadylic chloride, and the mixtures thereof.

4. The compound catalyst system according to claim 3, wherein said non-metallocene transition metal compound is titanium tetrachloride or titanium tetrabromide.

5. The compound catalyst system according to claim 1, wherein said metallocene compound is represented by the formula $(Cp)(Cp')MeR^1R^2$, wherein Cp and Cp' are the same or different and are independently unsubstituted or substituted cyclopentadienyl, fluorenyl, indenyl or tetrahydroindenyl, and Cp and Cp' can also be bridged by a group containing carbon atoms or other atoms, Me is a trasition metal selected from titanium, hafnium and zirconium, $R^1$ and $R^2$ are the same or different and are independently halogens or alkoxy groups.

6. The compound catalyst system according to claim 1, wherein said aluminoxane compound is represented by the formula

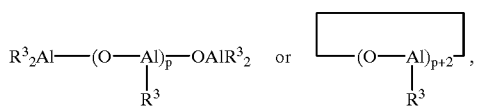

wherein $R^3$ is an alkyl group having from 1 to 12 carbon atoms, p is from 1 to 20.

7. The compound catalyst system according to claim 1, wherein said magnesium halide is one or more of magnesium dihalide, its complexes with water or an alcohol, and the derivatives thereof by replacing one halogen atom with a hydrocarby group or a hydrocarboxy group.

8. The compound catalyst system according to claim 7, wherein the magnesium dihalide is selected from the group consisting of magnesium dichloride, magnesium dibromide and magnesium diiodide.

9. The compound catalyst system according to claim 1, wherein the amounts of said epoxy compound and said organophosphorus compound are respectively 0.5–4 moles and 0.3–1 mole, per mole of magnesium halide.

10. The compound catalyst system according to claim 1, wherein said $C_1$–$C_{20}$ organic alcohol used in solid catalyst component A) is one or more of methanol, ethanol, isopropanol, propanol, butanol, hexanol or octanol.

11. The compound catalyst system according to claim 1, wherein said metallocene compound is one or more of bis(cyclopentadienyl)dichlorozirconium, bis (cyclopentadienyl)dichlorotitanium, bis(cyclopentadienyl) dichlorohafnium, bis(cyclopentadienyl) methylchlorotitanium, bis(cyclopentadienyl) dimethylzirconium, bis(cyclopentadienyl)dimethyltitanium, ethylenebis(indenyl)dichlorozirconium, ethylenebis (indenyl)dichlorohafnium, ethylenebis(2,4,7-trimethylindenyl)dichlorozirconium, ethylenebis (tetrahydroindenyl)dichlorozirconium, diphenylmethylene (indenyl)(cyclopentadienyl)dichlorozirconium, dimethylmethylene(indenyl)(cyclopentadienyl) dichlorozirconium, dimethylmethylene(indenyl)(3-methylcyclopentadienyl)dichlorozirconium, diphenylmethylene(fluorenyl)(cyclopentadienyl) dichlorozirconium, dimethylmethylene(fluorenyl) (cyclopentadienyl)dichlorozirconium, dimethylmethylene (fluorenyl)(cyclopentadienyl)dichlorohafnium, and dimethylgermylenebis(2-methyl4-phenyl-indenyl) dichlorozirconium.

12. The compound catalyst system according to claim 11, wherein said metallocene compound is bis (cyclopentadienyl)dichlorozirconium or ethylenebis (indenyl)dichlorozirconium.

13. The compound catalyst system according to claim 1, wherein said amounts of components (2)–(5) are respectively 0.5–50 moles, 0.3–3.0 moles, 0.1–0.5 mole and 0.3–15 moles, per mole of said magnesium halide.

14. A process for the preparation of the solid catalyst component A) used in the compound catalyst system according to claim 1, comprising the steps of:
   (1) preparing a solution of magnesium halide by dissolving the magnesium halide in a solvent system essentially consisting of an organic epoxy compound and an organophosphorus compound, at a temperature of 0° C. to 150° C.;
   (2) reacting the resultant magnesium halide solution from step (1) with a non-metallocene transition metal compound of titanium or vanadium, a metallocene compound and an aluminoxane compound at a temperature of −30° C. to 100° C.; and
   (3) washing the product from step (2) with an inert solvent to remove the metallocene compound and the aluminoxane compound which are not supported, followed by drying to obtain the solid catalyst component A);
wherein said organic alcohol is added in step (1) or step (2).

15. The process according to claim 14, wherein in step (2), said magnesium halide solution is reacted first with said non-metallocene transition metal compound to form a precipitate, which is reacted with said aluminoxane compound after being washed, then with said metallocene compound.

16. The process according to claim 15, wherein said precipitate is directly reacted with said aluminoxane compound/said metallocene compound mixture, without washing.

17. The process according to claim 14, wherein in step (2), said magnesium halide solution is reacted first with said aluminoxane compound/said metallocene compound mixture and then with said non-metallocene transition metal compound.

18. The process according to claim 14, wherein in the preparation of the magnesium halide solution, an inert diluent selected from the group consisting of a hydrocarbon, a halogenated hydrocarbon and mixtures thereof is further used.

19. The process according to claim 18, wherein in the preparation of the magnesium halide solution, an inert diluent selected from the group consisting of hexane, heptane, octane, benzene, toluene, xylenes, 1,2-dichloroethane, chlorobenzenes, and the mixtures of two or more of them is further used.

* * * * *